Jan. 25, 1949.  W. S. HALL, JR  2,460,222
TRAVELING NUT LIMIT STOP
Filed Feb. 20, 1946  2 Sheets-Sheet 1

Inventor
WALTER S. HALL, JR.

By
Attorney

Jan. 25, 1949. W. S. HALL, JR 2,460,222
TRAVELING NUT LIMIT STOP
Filed Feb. 20, 1946 2 Sheets-Sheet 2

Inventor
WALTER S. HALL, JR.
By M. C. Hayes
Attorney

Patented Jan. 25, 1949

2,460,222

UNITED STATES PATENT OFFICE 2,460,222

TRAVELING NUT LIMIT STOP

Walter S. Hall, Jr., Los Angeles, Calif., assignor to the United States of America as represented by the Secretary of the Navy Application February 20, 1946, Serial No. 649,086

1 Claim. (Cl. 74—424.8)

My invention relates to mechanical stops and more particularly to travelling nut limit stops such as are used in training gear for hydrophones.

In the application of hydrophones to determine the presence and direction of an underwater noise source, the hydrophone must be rotated about a vertical axis. This is generally accomplished by means of a crank-rotated worm driving a worm gear on the hydrophone shaft. The required traverse of the hydrophone in operation is greater than 400 degrees. However, rotation in any one direction must be limited in order to avoid tangling of control cables passing down the hydrophone shaft. Otherwise, continued rotation in a single direction would so entangle these cables that they would be damaged or destroyed in a short time. It has been proposed to use a flexible pin limit stop comprising a radially projecting pin mounted by a lost motion connection on the hydrophone shaft and adapted to engage a fixed stop. This mechanism has been found unsatisfactory, for it provides a maximum of 400 degrees traverse and is objectionably noisy in operation. In particular, the metal pin striking the metal stop makes a distinct clank that can be heard not only in the hydrophones, but by listening devices on enemy vessels, thereby not only impairing the operation of the hydrophone, but also revealing the presence of the ship upon which it is mounted.

It has been further proposed to use a travelling nut limit stop to avoid the above mentioned limitations of a flexible pin limit stop. A portion of the worm shaft is provided with threads having a pitch of about eight to the inch. A nut engaging these threads is held against rotation and adapted to traverse the shaft as the latter is rotated, stops being provided to limit the extent of traverse. Upon engagement of the travelling nut with the stop provided at either end of its travel, the worm shaft is held against further rotation in that direction, thereby limiting rotary movement of the hydrophones. The travelling nut limit has been found to be an improvement over the flexible pin limit stop in that it provides greater traverse, for example, about 630 degrees. However, it has been found in operation that when the travelling nut engages the stop it may freeze on the worm shaft, making it impossible to turn the shaft in either direction. This freezing has been found so severe that the crank handle on the shaft has been broken off in an effort to free the shaft and rotate it in the opposite direction. Moreover, the travelling nut limit, like the flexible pin, has proven to be noisy as the engagement of the metallic nut with the metallic stop produces an objectionable clank similar to that with the flexible pin.

In an effort to avoid the disadvantages of the travelling nut type stop, it has been proposed to form a deep circumferential groove of rectangular cross section in the face of each of the collars provided to limit motion of the travelling nut, and each end of the nut provided with an annular projection of rectangular cross section adapted to fit snugly into this groove. The traveling nut mechanism is enclosed in a casing adapted to be filled with lubricant so that the annular projections on the travelling nut and the corresponding grooves in the base of the collars of the shaft will act as hydraulic pistons and cylinders, respectively, the lubricant being trapped in the groove and serving to cushion the impact of the travelling nut with the collars. This proposal has been found unsatisfactory, for the close tolerances required between the annular projections of the nut and the grooves on the collar could not be maintained as a practical matter. Moreover, the gear frequently becomes improperly lubricated so that the travelling nut freezes despite the supposed hydraulic cushion.

I have found that the above mentioned disadvantages of travelling nut limit stops for hydrophones may be avoided by the use of a resilient member on each of the limit stops adapted to coact with annular projections on each side of the travelling nut. When the resilient surface is first struck by the projecting nut, the turning effort required increases, thereby warning the operator in advance that he is approaching the limit of travel. However, if it is necessary to continue turning the shaft to the absolute limit, the travelling nut will not freeze and the shaft will remain free to turn when retracted from the position with the nut against the stop. Furthermore, the objectionable noise inherent in previous limit devices is eliminated and the reduced efficiency of the hydrophone associated with this noise, together with the possibility of pick-up by enemy craft, is eliminated.

It is therefore the object of this invention to provide a travelling nut limit stop suitable for use with hydrophones.

More specifically, it is an object of this invention to provide a travelling nut limit stop which produces no noise upon reaching the end of its travel.

In accordance with another aspect of this invention, a travelling nut limit stop is provided which will not freeze or bind when forced against the limit.

Furthermore, it is an object of this invention to provide a travelling nut limit stop which forewarns the operator when the limit is approached.

Other objects and aspects of this invention will be apparent from the following description and claim:

Figure 1:
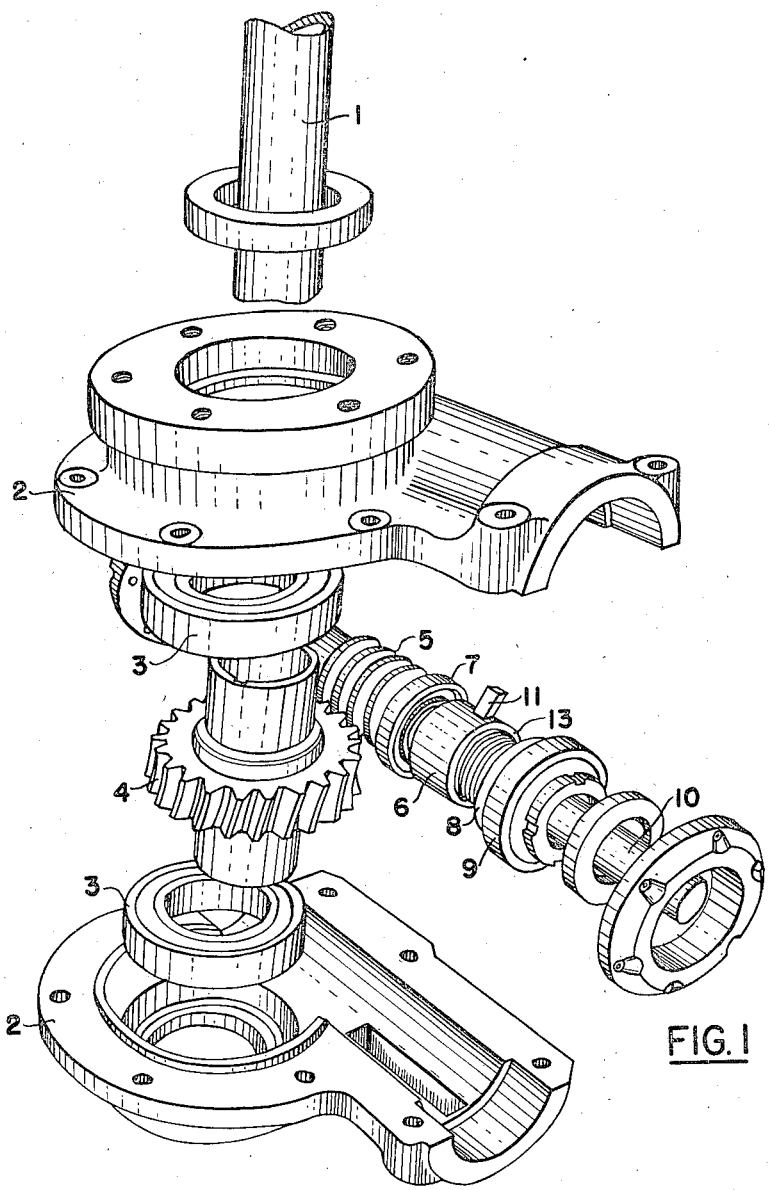
Figure 1 shows an exploded view of the complete gear box and rotating unit for a hydrophone.

Referring now to Figure 1, the hydrophone is mounted on vertical shift 1 which extends through the hull of the vessel to the operating shaft 10. Operating shaft 10 is connected to hydrophone shaft 1 by means of worm shaft 5 and worm wheel 4. Shaft 1 is mounted on ball bearings 3 and shaft 10 is mounted on ball bearings 9. Shaft 10 is provided with stop nut 6 which is in threaded engagement with threads 13 on shaft 10. Stop nut 6 is provided with lug 11 adapted to slide in a suitable slot or groove provided in a fixed portion of the apparatus to hold the nut against rotation, but which will permit movement of the nut axially of the shaft due to its engagement with the threads 13, until it meets either one of the stops 7 or 8. The entire assembly is enclosed in gear case 2 which acts as a receptacle for grease and protects the mechanism from external damage.

Figure 2:
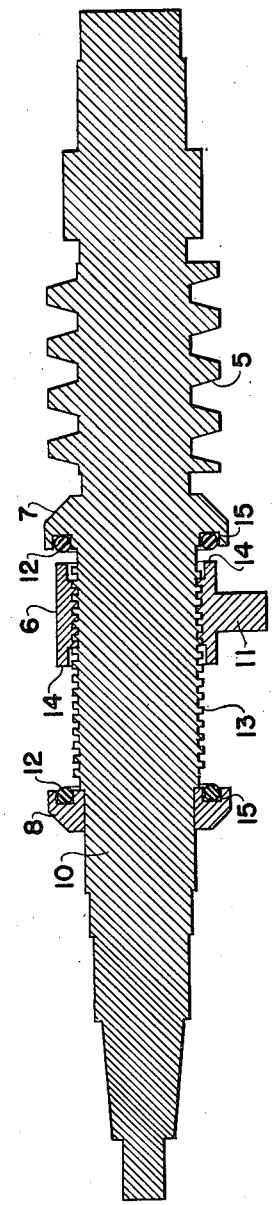
Figure 2 shows a detailed cross-sectional view of my travelling nut limit stop.

Figure 2 shows in further detail the method whereby my invention limits rotation. In the figure, threaded portion 13 of shaft 10 is provided with an annular shoulder or collar 7 while at the other end of the threaded portion there is provided a similar though removable shoulder or collar 8. An annular grove 15 of rectangular cross section is provided in the surface of each of the collars 7 and 8 which faces threaded portion 13 of shaft 10. At each end of the travelling nut 6 there is provided an annular projection 14 of rectangular cross section adapted to fit relatively snugly into the groove 15 of the collars 7 and 8. An annular cushion 12 formed of soft resilient material, such as neoprene, is positioned in each of the annular grooves 15 of collars 7 and 8 as shown.

Upon reaching the end of its traverse in either direction, one projection 14 of travelling nut 6 engages a neoprene ring 12 so that the impact of the nut with the stop is cushioned and no freezing occurs. The stopping of the travelling nut is thus gradual and the increased resistance associated with turning of the operating shaft 10 can be felt by the operator one-quarter to one-half a turn before the final stop is reached. The operator is thus forewarned in time to stop turning the handle before the travelling nut comes up firmly against the stop. During this period, the round neoprene ring 12 becomes distorted and is pressed into the rectangular groove 15.

If the exigencies of the situation demand that the hydrophone be turned further against the stop, the operator may intentionally do so, thereby obtaining one-quarter to one-half a turn of additional rotation. This rotation, being infrequent, has little effect on cables and other apparatus in the hydrophone shaft. No freezing will occur in this case as the neoprene ring acts to distribute the pressure exerted by the limit collar, thereby providing a substantial resistance to motion without the concentrated and unbalanced forces which lead to freezing.

The neoprene ring, interposed between the travelling nut 6 and the limit collars 7 and 8, not only prevents freezing but also eliminates the objectionable noise that heretofore has resulted from impact of the metal nut with the metal collars. This avoids the noise in the hydrophone which previously resulted from such impact and prevents the generation of noise which might be picked up by enemy vessels. Furthermore, the shock incident to metal-to-metal impact is avoided and jarring of the equipment prevented.

In general, it is considered preferable to use a circular section in the neoprene ring and a rectangular section in the annular collar grooves. However, this invention is not limited to the particular shape of the ring, or to confining the ring in a groove. It will likewise be understood that while neoprene is desirable because of its oil resistant properties, other rubber-like or rubber compositions may be used, the principal requirements being that it yield without permanent deformation and produce minimum noise when struck.

It has been found that the neoprene rings are not damaged in any way by repeated impact of the travelling nut. Extensive tests over a period of several weeks of normal operation failed to produce any visible effect on the rings.

It will be evident to those skilled in the art that the traverse of the travelling nut may be limited by collars provided on the casing or other member adjacent to the collars. Furthermore, the stops may be made adjustable by screws or other devices provided for the purpose.

This invention is capable of wide variation from the particular form described herein, its scope being defined in the appended claim.

I claim:

A travelling nut limit stop comprising a shaft, a casing rotably supporting the same, said shaft having a threaded portion, a nut threaded on said threaded portion, an annular projection on each end of said nut, means on said nut and casing preventing rotation of said nut, stops mounted on said shaft at the opposite ends of said threaded portion, said stops having annular grooves facing said annular projections, respectively, and in alignment therewith and resilient annular members in said grooves adapted to engage said annular projections, respectively, to cushion the engagement of said nut against either of said stops.

WALTER S. HALL, Jr.

REFERENCES CITED

The following references are of record in the file of this patent:

UNITED STATES PATENTS

| Number | Name | Date |
|---|---|---|
| 1,301,137 | La Barre | Apr. 22, 1919 |
| 1,632,927 | Shackelford | June 21, 1927 |
| 1,634,677 | Miller | July 5, 1927 |
| 1,939,933 | Wacker | Dec. 19, 1933 |
| 2,057,187 | Gallasch | Oct. 13, 1936 |
| 2,084,845 | Holmes | June 22, 1937 |
| 2,245,457 | Brassell | June 10, 1941 |
| 2,297,137 | Fennema | Sept. 29, 1942 |
| 2,336,133 | Thornhill | Dec. 7, 1943 |
| 2,349,370 | Orner | May 23, 1944 |
| 2,356,861 | Link | Aug. 29, 1944 |
| 2,398,841 | Morris | Apr. 23, 1946 |